F. SIMEK.
SNAP FASTENER.
APPLICATION FILED MAY 18, 1918.

1,279,923.

Patented Sept. 24, 1918.

Witnesses:

Inventor,
Frank Simek,

UNITED STATES PATENT OFFICE.

FRANK SIMEK, OF CHICAGO, ILLINOIS, ASSIGNOR TO COLUMBIA FASTENER COMPANY, OF CHICAGO, ILLINOIS, A CORPORATION OF ILLINOIS.

SNAP-FASTENER.

1,279,923.  Specification of Letters Patent.  Patented Sept. 24, 1918.

Application filed May 18, 1918. Serial No. 235,235.

*To all whom it may concern:*

Be it known that I, FRANK SIMEK, a subject of the Emperor of Austria, and who has taken out his first papers for citizenship in the United States, residing at Chicago, in the county of Cook and State of Illinois, have invented a new and useful Improvement in Snap-Fasteners, of which the following is a specification.

My invention relates, more particularly, to snap fasteners of the type which are adapted to be applied to the free edges of an article for releasably securing these edges together in overlapped condition, one of the elements of the fastener being a stud-device secured to one of the free edges and adapted to enter, and interlock with, a socket-device formed of a plurality of parts which are secured to extend at opposite faces of the other free edge of the article with the material of this free edge clamped to the fastener, the invention having been devised for use, more particularly, as a fastener for gloves, though not to the exclusion of its use in any other situation in which it is desirable; and my primary object is to provide a relatively inexpensive form of fastener of the type above stated, which will be firmly gripped to the article to which it is applied, without damaging the article in the assembling operation.

Referring to the accompanying drawing:—

Figure 1:
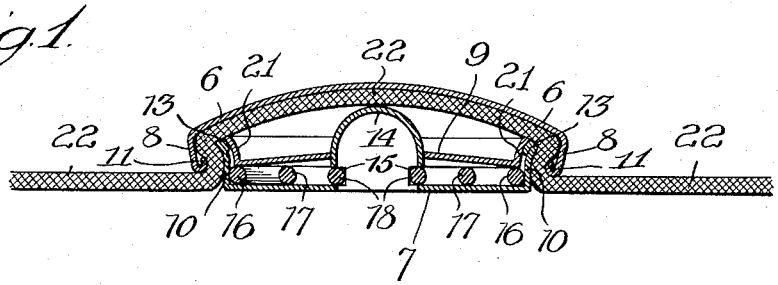
Figure 2:
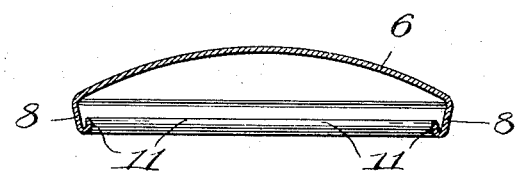
Figure 3:
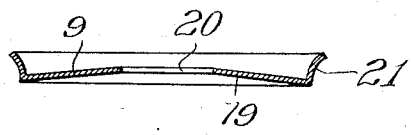
Figure 4:
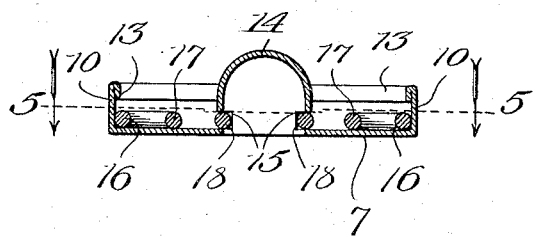

Figure 1 is a sectional view of the free edge of an article, as for example a glove, the edges of which are to be provided with a snap fastener, showing the socket element of my improved fastener device secured in position thereon. Fig. 2 is a similar view of the cap-plate forming a part of the fastener. Fig. 3 is a similar view of a former plate employed. Fig. 4 is a similar view of a spring-equipped member which telescopes with the cap-plate of Fig. 2, is located at the opposite side of the article and is a part with which the stud portion of the fastener engages; and Fig. 5, a section taken at the line 5—5 on Fig. 4 and viewed in the direction of the arrows.

The socket element of my improved fastener comprises a cap-plate 6, a flanged plate 7 adapted to be applied to the material of the article to be equipped with the fastener, at the side opposite that at which the plate 6 extends, and telescope with a flange 8 of the plate 6, the plate 7 forming the socket portion of the fastener and equipped with a spring-device hereinafter described; and a former plate 9 adapted to be interposed between the plate 7 and the material of the article lying against the inner surface of the cap-plate 6, the flange portion 10 of the plate 7 interlocking the material of the article between it and the flange 8.

Figure 5:
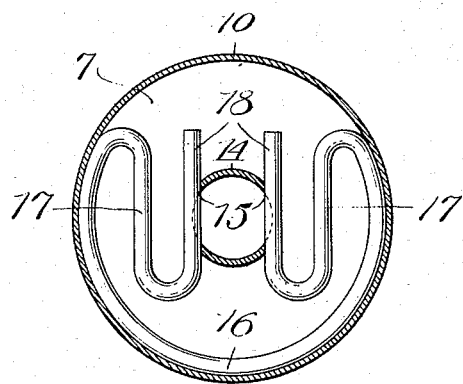

The plate 6 is preferably of dished form, as represented, its flange 8 tapering slightly inwardly and preferably rolled inwardly and upwardly at its lower edge, as indicated at 11. The plate 7 is preferably constructed from sheet metal and is of the form shown in Fig. 4, its flange 10 extending substantially at right angles to the body of the plate 7 with its free edge rolled downwardly and inwardly, as represented at 13, this plate having struck up therefrom at its central portion, the socket-forming section 14 which is slotted at diametrically-opposed sides adjacent the body-portion of the plate 7, as indicated at 15. The plate 7, as stated above, carries a spring element, resilient portions of which extend into the slots 15 for engagement with a grooved stud-equipped element which would be carried by the other free edge of the article to be equipped with the fastener device, for releasably holding the socket-portion of the device and the stud-portion thereof together. In the particular form shown, the spring device is formed of a single piece of spring wire presenting the body portion 16 which is adapted to lie within the flange 10 of the plate 7 and fit against it under tension, as represented in Fig. 5, and reversely bent portions 17 presenting free sections 18 which extend normally under the action of the spring-device, into the slotted portions 15 of the socket 14 and against the walls of this socket portion, as shown in Figs. 4 and 5. The former plate 9, which preferably is constructed of steel, is formed of the body portion 19 containing a central opening 20 provided about its periphery with an upwardly-extending outwardly-flaring annular flange 21 preferably of curved shape in cross section, as represented in Fig. 3, the diameter of this flanged portion of the disk being greater than the diameter of the flanged portion of the plate 7 in the condition shown in Fig. 4.

The parts of the device are assembled with the article to which it is to be attached in the following manner:

The cap-plate 6 is applied to one side of the article, such as that represented at 22 and which may be one of the free edges of a glove to be equipped with the fastener device. The former plate 9 is then introduced into the cap-plate 6 to the position shown in Fig. 1 wherein it bears at its flange 21 against the material 22 extending across the inner surface of the body portion of the cap-plate 6. The plate-portion 7, with the spring-device 16 applied to the position as hereinbefore explained and shown in the drawings, is then applied to a position in which its flange 10 bears against the outer curved surface of the flange 21 of the plate 9. Force is then applied against the plates 6 and 7 in a direction to squeeze them together, with the result of causing the flange 10 to become expanded into firm interlocking relation with the material 22 between the flanges 8 and 10, by reason of the engagement of the flanges 10 with the flange 21.

In the assembling operation stated, the socket-portion 14 enters through the opening 20 in the former plate 9 and in the final position of the parts (Fig. 1), the body-portion of the plate 9 extends very closely adjacent the spring-device particularly its portion 16, and thus operates to perform, in addition to the forming function hereinbefore referred to, the function of holding the spring-device against buckling and insure the positive and certain action of this device in its coöperation with the stud-member hereinbefore referred to and which is not illustrated, as it does not form any part of my invention.

It will also be noted that by forming the socket section of the fastener in accordance with my invention, the telescoping parts thereof may be so proportioned that in the initial assembling of the parts of the device, preparatory to the squeezing operation above referred to, the material of the article to which the device is to be applied will not be gripped between the opposing flanges, thus preventing injury to the material, the clamping of the fastener in place being effected by distention of the flange 10 which, in such operation, does not rub against the material in such a way as to injure it.

While I have illustrated and described a certain construction involving my invention, I do not wish to be understood as intending to limit it thereto, as the same may be variously modified and altered without departing from the spirit of my invention, it being my intention to claim my invention as fully and completely as the prior state of the art will permit.

What I claim as new and desire to secure by Letters Patent is—

1. In combination with an article portions, of which are to be releasably fastened together, a socket-device secured to one of said portions and comprising a disk located at one side of said portion, said disk containing an opening and provided with a flange at its marginal edge, a spring-device carried by said disk and projecting into said opening, a second disk at the opposite side of said portion and having a flange, the material of said portion extending over the inner surface of said second disk, and a former plate interposed between said disks with the flange of said first-named disk extending, in deformed condition, against the "former surface" of said former plate and interlocked with the flange of said second disk, with the material of said portion interposed between said disks and clamped between said flanges, said former plate extending closely adjacent to said spring-device and serving as a guide surface for the latter.

2. In combination with an article portions of which are to be releasably fastened together, a socket-device secured to one of said portions and comprising a disk located at one side of said portion, said disk containing an opening and provided with a socket containing openings in its wall and provided with a flange at its marginal edge, a spring-device carried by said disk and projecting at resilient portions thereof through the openings in the wall of said socket-portion and into the latter, a second disk at the opposite side of said portion and having a flange, the material of said portion extending over the inner surface of said second disk, and a former plate interposed between said disks with the flange of said first-named disk extending, in deformed condition, against the "former surface" of said former plate and interlocked with the flange of said second disk, with the material of said portion interposed between said disks and clamped between said flanges, said former plate extending closely adjacent to said spring-device and serving as a guide surface for the latter.

FRANK SIMEK.